(12) United States Patent
Cook et al.

(10) Patent No.: US 7,477,469 B2
(45) Date of Patent: Jan. 13, 2009

(54) ACTIVE PROTECTION SYSTEM

(75) Inventors: Brett Alan Cook, Westminster, CO (US); James Carl Hatfield, Jr., Johnstown, CO (US); Jonathan Williams Haines, Boulder, CO (US); JyeKai K. Chang, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 9 days.

(21) Appl. No.: 11/605,900

(22) Filed: Nov. 28, 2006

(65) Prior Publication Data

US 2007/0253093 A1    Nov. 1, 2007

Related U.S. Application Data

(60) Provisional application No. 60/741,790, filed on Apr. 27, 2006.

(51) Int. Cl.
*G11B 5/54* (2006.01)
*G11B 21/12* (2006.01)

(52) U.S. Cl. ...................................... 360/75
(58) Field of Classification Search .................. None
See application file for complete search history.

(56) References Cited

U.S. PATENT DOCUMENTS

| | | |
|---|---|---|
| 4,970,610 A | 11/1990 | Knappe |
| 5,097,122 A | 3/1992 | Colman et al. |
| 5,285,431 A | 2/1994 | Ogawa |
| 5,398,221 A | 3/1995 | Ogawa |
| 5,416,658 A | 5/1995 | Sega et al. |
| 5,526,996 A | 6/1996 | Ebner et al. |
| 5,637,970 A | 6/1997 | Kisaka et al. |
| 5,675,321 A | 10/1997 | McBride |
| 5,856,967 A | 1/1999 | Mamin et al. |
| 5,880,569 A | 3/1999 | Suzuki et al. |
| 6,018,431 A * | 1/2000 | Carlson et al. ............. 360/75 |
| 6,101,062 A | 8/2000 | Jen et al. |
| 6,239,947 B1 | 5/2001 | Fan et al. |
| 6,520,013 B1 | 2/2003 | Wehrenberg |
| 6,633,520 B1 | 10/2003 | Song |
| 6,768,066 B2 | 7/2004 | Wehrenberg |

(Continued)

OTHER PUBLICATIONS

Gregory J. Galvin, Ph.D., President and CEO, Kionix, Inc., "Inertia Sensing for Hard Disk Drive Drop Protection," 2Q 2005 edition of Insight, Online Journal of IDEMA, p. 1-8.

*Primary Examiner*—Hoa T. Nguyen
*Assistant Examiner*—James L Habermehl
(74) *Attorney, Agent, or Firm*—Fellers, Snider, et al.

(57) ABSTRACT

Method and apparatus for actively protecting a device from damage due to an impact or other acceleration condition. An active protection system is provided with a sensor which outputs an acceleration signal in relation to an acceleration state of the device. A circuit processes the acceleration signal in relation to a configuration control input indicative of an operational environment in which the device is operated, and a protection mechanism configures the device in relation to the processed acceleration signal. A configuration control module preferably supplies the configuration control input as a user selectable or host input. Preferably, protection mechanism places the device in a protective state to protect against damage due to an imminent impact, such as from a free fall condition. The processing preferably comprises adaptive filtering of the acceleration signal and the application of one or more thresholds to detect said imminent impact.

18 Claims, 7 Drawing Sheets

U.S. PATENT DOCUMENTS

| | | |
|---|---|---|
| 6,778,348 B1 | 8/2004 | Carley |
| 6,868,726 B2 | 3/2005 | Lemkin et al. |
| 7,042,663 B2 * | 5/2006 | Shimotono et al. ............ 360/75 |
| 7,142,385 B2 * | 11/2006 | Shimotono et al. ............ 360/60 |
| 7,154,692 B2 * | 12/2006 | Ogawa et al. ................. 360/61 |
| 7,161,758 B2 * | 1/2007 | Adapathya et al. ........... 360/75 |
| 2003/0079038 A1 | 4/2003 | Robbin et al. |
| 2004/0252397 A1 | 12/2004 | Hodge et al. |
| 2005/0190059 A1 | 9/2005 | Wehrenberg |
| 2006/0136168 A1 * | 6/2006 | Nakamura et al. .......... 702/141 |
| 2006/0236761 A1 * | 10/2006 | Inoue et al. .................... 73/510 |
| 2007/0067139 A1 * | 3/2007 | Kobayashi et al. .......... 702/150 |
| 2007/0086108 A1 * | 4/2007 | Kuroki et al. ................. 360/75 |
| 2007/0118326 A1 * | 5/2007 | Starodubtsev et al. ....... 702/141 |
| 2007/0159710 A1 * | 7/2007 | Lucas et al. ................... 360/75 |
| 2007/0162238 A1 * | 7/2007 | Jeansonne et al. ............. 702/41 |

* cited by examiner

| MODE | ENVIRONMENTAL CONFIGURATION |
|---|---|
| 0 | STEADY STATE |
| 1 | WALKING |
| 2 | RUNNING/JOGGING |
| 3 | IN AUTOMOBILE |
| 4 | FREE FALL |
| . . . | . . . |
| N | ROTATIONAL |

ACTIVE PROTECTION SYSTEM

RELATED APPLICATIONS

The present application makes a claim of domestic priority under 35 U.S.C. §119(e) to U.S. Provisional Patent Application No. 60/741,790 filed Apr. 27, 2006.

FIELD OF THE INVENTION

The claimed invention relates generally to the field of motion detection systems and more particularly, but not by way of limitation, to an apparatus and method for actively protecting a device from damage due to an impact or other acceleration condition.

BACKGROUND

Portable devices can often be dropped or otherwise subjected to excessive acceleration forces during operation and handling. For example, a portable electronic device such as a computer laptop, media player or digital/cell phone may be accidentally knocked off of a desk, dropped onto the floor, or even sent flying through the air at a time when the device is in use.

A variety of approaches have been proposed in the art in an effort to detect the application of such forces to a device, and to place the device in a protective mode to protect against damage as a result of a high force impact.

Some data storage devices include moveable transducers that fly adjacent rotatable media to carry out data read and write operations with the media. The devices can be configured to park the transducers in a safe location, such as on a load/unload ramp structure, when a free fall condition is detected. In this way, the transducers are not operationally adjacent the media surfaces when the device hits the ground, thus avoiding contact between the transducers and media surfaces that may induce damage to the device.

While operable, with the continued consumer demand for various types of portable devices, there remains a continual need for improvements whereby a device can be operated in a variety of environments and yet protected against damage due to changes in acceleration state. It is to these and other improvements that preferred embodiments of the present invention are generally directed.

SUMMARY OF THE INVENTION

Preferred embodiments of the present invention are generally directed to an apparatus and method for actively protecting a device from damage due to an impact or other acceleration condition.

In accordance with preferred embodiments, an active protection system is provided with a sensor which outputs an acceleration signal in relation to an acceleration state of the device. A circuit processes the acceleration signal in relation to a configuration control input indicative of an operational environment in which the device is operated, and a protection mechanism configures the device in relation to the processed acceleration signal.

A configuration control module preferably supplies the configuration control input as a user selectable or host input. Preferably, protection mechanism places the device in a protective state to protect against damage due to an imminent impact, such as from a free fall condition. The processing preferably comprises adaptive filtering of the acceleration signal and the application of one or more thresholds to detect said imminent impact.

These and various other features and advantages which characterize the claimed invention will become apparent upon reading the following detailed description and upon reviewing the associated drawings.

DETAILED DESCRIPTION

Figure 1:
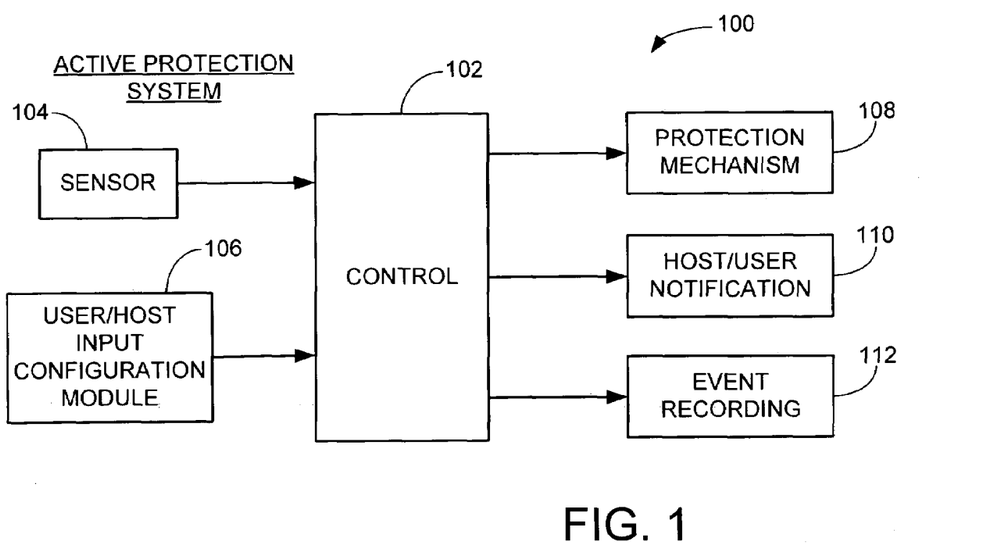
FIG. 1 is a functional block representation of an active protection system for a device constructed and operated in accordance with preferred embodiments of the present invention.

FIG. 1 shows a functional block diagram for an active protection system 100 in accordance with preferred embodiments of the present invention. The system 100 can be incorporated into any number of different types of devices, including but not limited to portable electronic devices such as computer laptops, media players, digital/cell phones, and personal data assistants (PDAs); medical devices such as syringes or other fluidic injection or control systems; optical systems such as binoculars, cameras, scopes; chemical containment systems; and so on. Other areas of application will readily occur to the skilled artisan in view of the following discussion.

The active protection system 100 generally includes a control block 102 which provides overall control for the system 100. The control block 102 can comprise a programmable processor or other electronic circuit, although such is not limiting. A sensor 104 provides acceleration input signals to the control block 102 to provide an indication of an acceleration state of the device in which the system 100 is deployed.

A user/host input configuration module 106 provides a capability of a user of the device, or a host portion of the device, to provide configuration control inputs to the control block 102. As explained below, these control inputs prepare the active protection system 100 to protect the device in response to a given environment or other operational requirements for the device.

The control block 102 is preferably to provide output(s) to at least one module. Three exemplary modules are shown as: a protection mechanism 108, a host/user notification block 110, and an event recording mechanism 112. Preferably, in the event of the detection of an anomalous acceleration condition such as a free fall event in which the device experiences a free fall state, the control block 102 directs the protection mechanism 108 to place the device in a protective state in order to reduce a likelihood of damage as a result of the detected acceleration condition. The host/user notification block 110 provides an indication to the user/host of the event, and the event recording mechanism 112 provides a log or other historical recording of the event.

Figure 2:
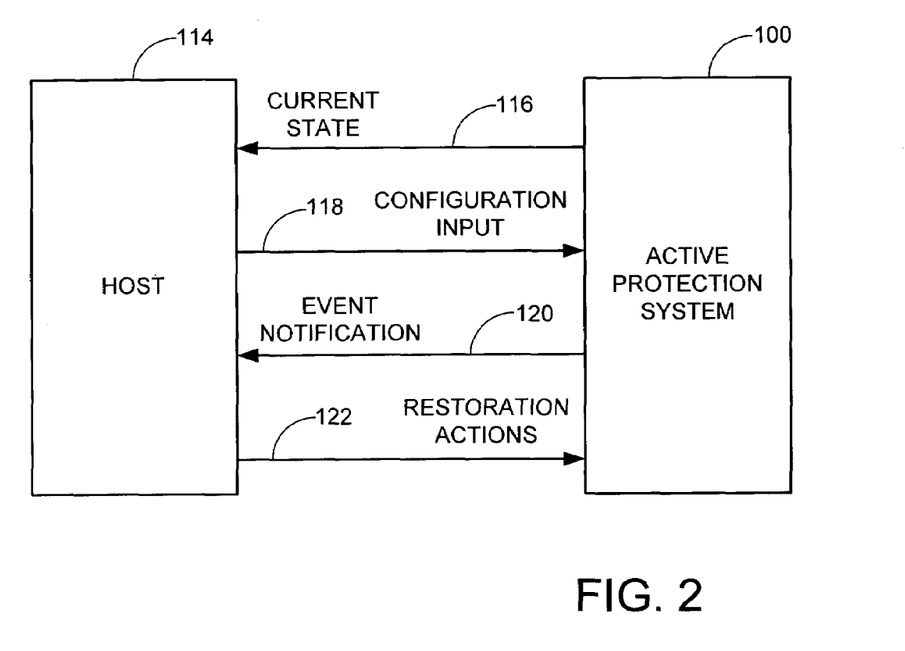
FIG. 2 generally sets forth preferred types of communication sequencing that take place during the operation of the device of FIG. 1.

FIG. 2 shows a preferred sequence of communication operations that take place with the active protection system 100 such as with a host device 114. A current state of the device in which the active protection system 100 is deployed is transmitted as shown via path 116. The current state communication can take a number of forms including an operational configuration of the device, and/or a then-existing acceleration state of the device induced by the surrounding environment. It will be appreciated that the path 116 does not necessary require a conductive path along which electrical signals are conducted; for example, the current state can be communicated by a visual indicator provided by the system 100.

In response to the current state, the host device 114 supplies a configuration input via path 118. As mentioned above, the configuration input preferably places the active protection system 100 in a suitable mode to facilitate protection of the device in relation to the detected current state.

At such time that an acceleration event likely to cause damage is detected by the active protection system 100, the system operates as discussed above to protect the device. Notification of the occurrence of the event is supplied to the host 114 as shown by path 120. Restorative actions are then supplied to the device by the host 114, as shown by path 122, which preferably place the device back in an operational state.

Figure 3:
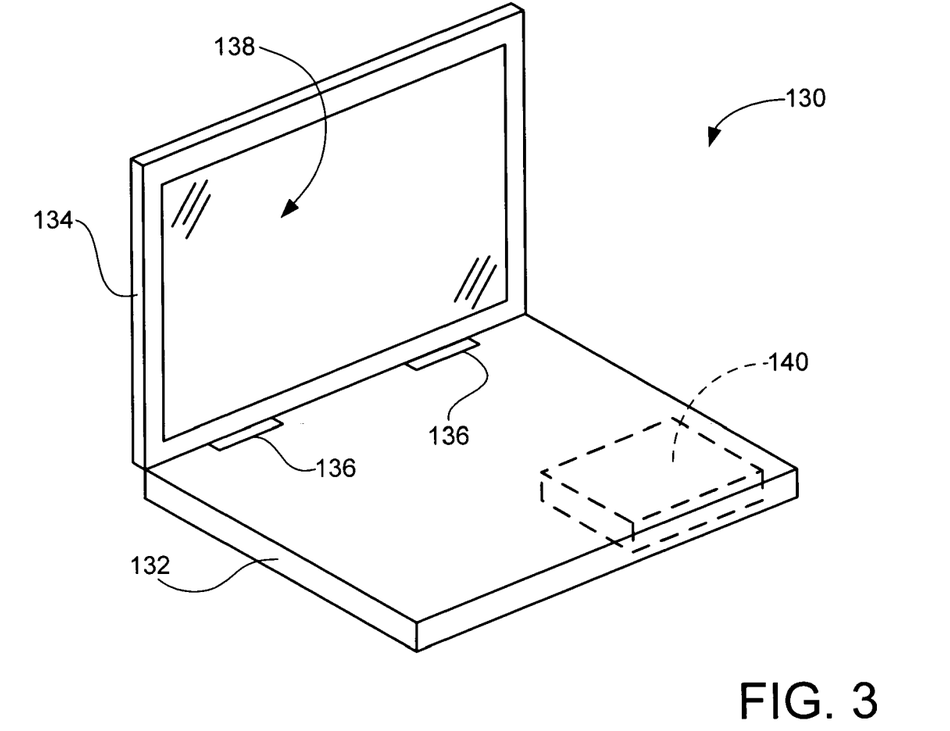
FIG. 3 shows a particular exemplary device as a computer laptop with an integrated data storage device therein.

FIG. 3 provides an exemplary environment in which the active protection system 100 can be advantageously practiced. More specifically, FIG. 3 shows a schematic representation of a computer laptop 130 of the type comprising a personal computer (PC) device that can transported and operated by the user in a number of locations.

The computer laptop 130, also referred to herein as the "host device," includes a base 132 with a keyboard and mouse input (not shown) accessible by the user. A cover 134 is hingedly affixed to the base 132 via hinges 136 so as to move between a closed position and an open position. The inside surface of the cover provides a view screen 138.

The base 132 includes a number of operational components including a power supply, a mother board with CPU, and peripheral devices to enable communication and data transfer with portable media and/or a network (also not shown). An internal data storage device is represented in broken line fashion at 140. While the data storage device is preferably characterized as a 2.5 inch form factor hard disc drive, such is merely for purposes of illustration and is not limiting as other form factors, other types of storage devices, other types of media, etc. can readily be utilized as desired. It is contemplated that the device 140 incorporates the active protection system 100 as described above.

Figure 4:
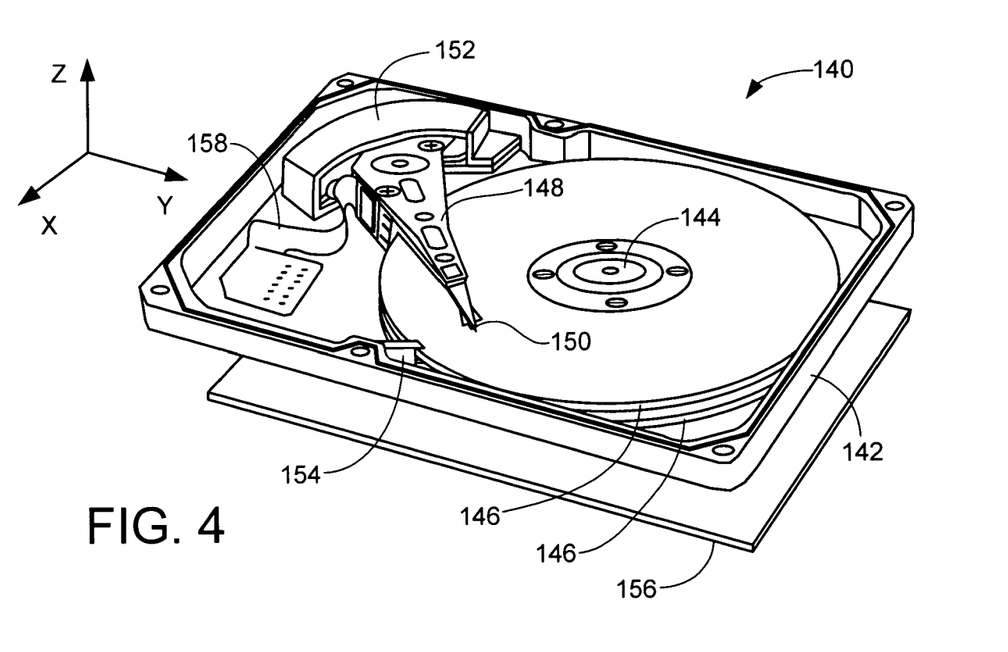
FIG. 4 provides an isometric, partially exploded view of the data storage device.

An exploded view of the data storage device 140 is set forth in FIG. 4. A base deck 142 mates with a top cover (not shown) to provide a sealed housing. A spindle motor 144 rotates data storage media 146 at a constant high speed during device operation. A rotary actuator 148 supports a corresponding array of data transducers (read/write heads) 150 adjacent the media surfaces.

The actuator 148 generally moves the transducers 150 in response to a voice coil motor (VCM) 152. When the device 140 is deactivated, the transducers 150 are preferably unloaded from the media via movement to a load/unload ramp structure 154. However, other arrangements can readily be used including contact start-stop (CSS) landing zones on the media. Control electronics for the device 140 are provided on an externally mounted disc drive printed circuit board (PCB) 156. Communication between the PCB 156 and the actuator and VCM 148, 152 is facilitated by a flex circuit assembly 158.

Figure 5:
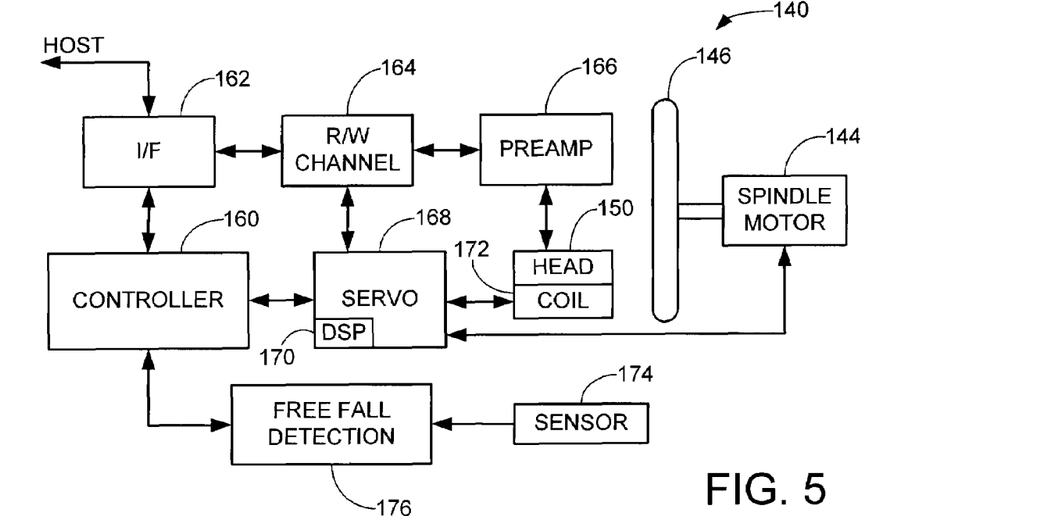
FIG. 5 sets forth a functional block diagram for the data storage device of FIG. 4.

A generalized functional block diagram for the device 140 is set forth in FIG. 5. Top level control for the device is supplied by a controller 160, preferably characterized as a programmable processor. Host I/O operations are coordinated with an interface (I/F) circuit 162.

Data supplied to the I/F circuit 162 for writing to the media 146 are encoded and serialized by a read/write (R/W) circuit 164. A preamplifier/driver (preamp) circuit 166 applies the appropriate write currents to the transducer 150 to write the encoded and serialized data. To read back data previously stored to the media, the transducer 150 transduces a readback signal that is preamplified by the preamp 166 and processed by the R/W circuit 164. The reconstructed data are thereafter transferred by the I/F circuit 162 to the host.

A closed loop servo control block 168 preferably includes a second processor (DSP 170). The servo control block 168 operates to apply current to a coil 172 of the VCM 152 (FIG. 3) to move the transducers 150 as required, as well as to control operation of the spindle motor 144.

A sensor 174 is configured to provide acceleration state signals to a protection processing circuit 176. The sensor 174 preferably comprises a piezoelectric transducer which provides multi-axis acceleration outputs along three orthogonal axes x, y and z, as shown in FIG. 4, although such is not limiting.

Figure 6:
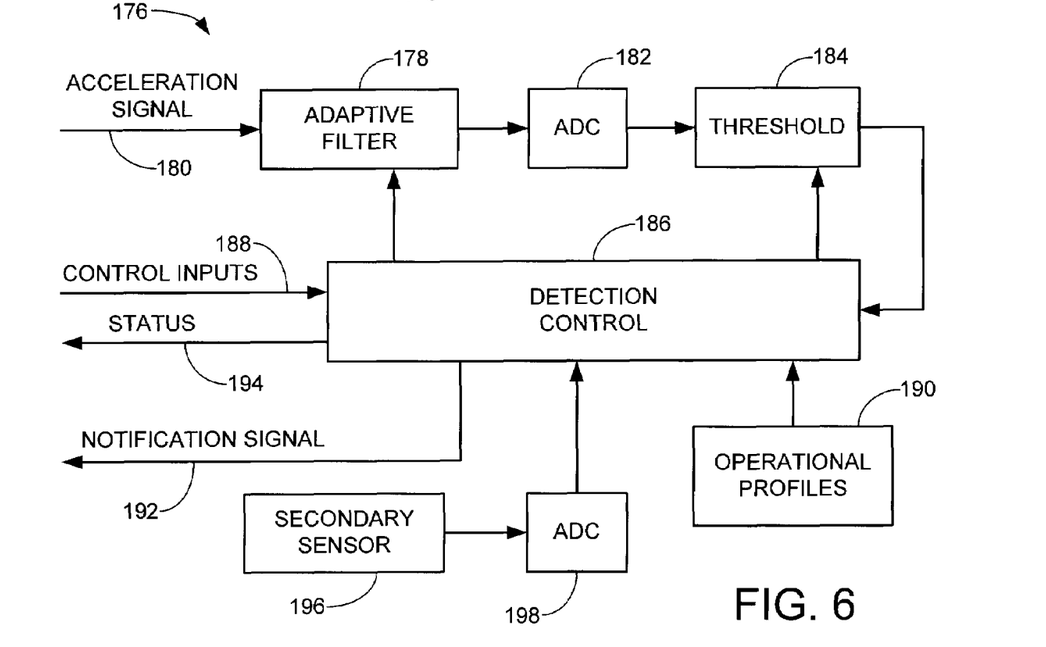
FIG. 6 sets forth relevant preferred aspects of the active protection system.

A preferred construction for the protection processing circuit 176 is set forth by FIG. 6. Acceleration signal(s) from the sensor 174 are preferably supplied to an adaptive filter block 178 via paths 180, and converted to digital form by an analog-to-digital (ADC) 182. A threshold value is applied to the digital output by threshold block 184.

The signal filtering process carried out by the adaptive filter 178, as well as the threshold values applied by the threshold block 184, are preferably selected by a detection control block 186 in response to control inputs provided via path 188 and operational profiles stored in table block 190. Generally, an imminent impact signature is detected in relation to the digital output of the ADC 182 and the associated threshold applied by the threshold block 184.

In such case, a notification signal is output by the detection control block 186 via path 192. The notification signal enables the controller 160 to place the device 140 in a protected mode, such as by parking the transducers 146 on the ramp structure 154.

As required, the detection control 186 further provides a status signal on path 194 to indicate a current status of the system. For example, the status signal can comprise an indication of an existing acceleration state as provided by the sensor 174.

Alternatively or additionally, a second sensor 196 can be configured to provide state information to a second ADC 198, so that the status of the system is provided in relation to the output of this second sensor 196. The second sensor 196 can be a piezoelectric transducer similar to the first sensor 174, or can comprise a different type of sensor such as, for example, a mechanism which detects whether the cover 138 of the laptop 130 is open.

While the protection processing circuit 176 of FIG. 5 is shown as a different block from the controller 160, in alternative preferred embodiments at least some of the processing carried out by the protection processing circuit 176 can be performed by the controller 160.

The active protection system 100 generally operates to provide robust protection of the device 140 under a number of different operational environments. The system preferably includes intelligent processing capabilities designed to both detect free fall and other imminent damage conditions while at the same time not triggering false alarms.

The capabilities of the system 100 to operate in this manner will now be discussed with reference to FIG. 7, which sets forth a number of graphical representations for signals generated when the laptop 130 is dropped, such as from a table top to the floor, when the cover 138 is in a closed position.

Figure 7:
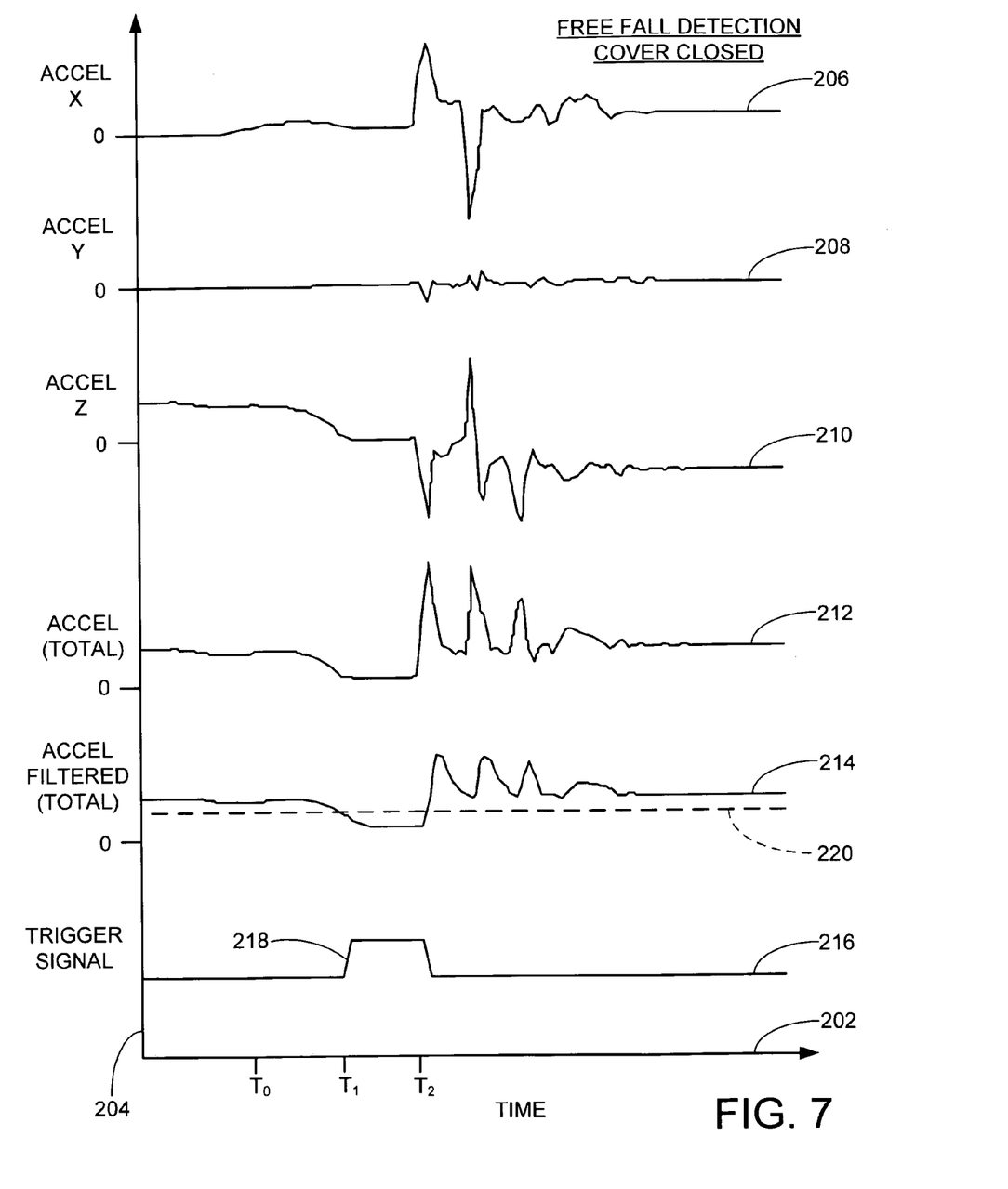
FIG. 7 provides graphical representations of a number of curves generated by the active protection system in a first operational condition in which the computer laptop is dropped in a closed cover orientation.

The graphical representations in FIG. 7 are generally set forth against a common elapsed time x-axis 202 and a common amplitude y-axis 204. The free fall event is contemplated as initiating proximate time $T_0$.

Exemplary acceleration signals in the respective x, y and z directions are shown at 206, 208 and 210. For reference, these signals may be representative of the signals supplied via path 180 in FIG. 6 by the sensor 174 in FIG. 5. A composite acceleration signal is shown at 212, and represents the composite (total) vector from the signals 206, 208, 210. The composite signal 212 can be generated by the sensor 174 or by other aspects of the circuitry such as an input stage of the filter 178. A preferred approach to calculating the composite acceleration vector is set forth in the following relation:

$$a_T = \sqrt{(a_X + a_Y + a_Z)} \quad (1)$$

where $a_T$ is the composite acceleration value, and $a_X$, $a_Y$ and $a_Z$ are the respective acceleration components in the x, y and z directions.

A filtered composite signal is shown at 214, which preferably results from the application of low pass filtering to the signal 212. This filtering is contemplated as carried out by the adaptive filter 178.

A trigger signal 216 is generated in response to the operation of the threshold block 184. More particularly, it can be seen that the signal 216 includes a pulse with leading edge 218 that generally corresponds to the filtered composite signal 214 falling below threshold level 220. This occurs at time $T_1$ and indicates detection of an on-going free fall event. A notification signal is accordingly output to place the device 140 in a protected mode pending impact.

It is contemplated that there will be sufficient time for the controller 160 to direct the parking of the transducers 150 onto the ramp structure 154 and latch the actuator 148 well before the subsequent impact takes place. This subsequent impact is generally indicated by the respective peaks in signals 206, 208, 210, 212 and 214 following time $T_2$. The trigger signal pulse further includes a trailing edge 222 that corresponds to a subsequent rise in amplitude of the composite signal 214 above the threshold 220 upon such impact. Thus, as desired the trigger signal 216 can further be used as part of the confirmation process that an impact in fact took place after the protection operation.

Figure 8:
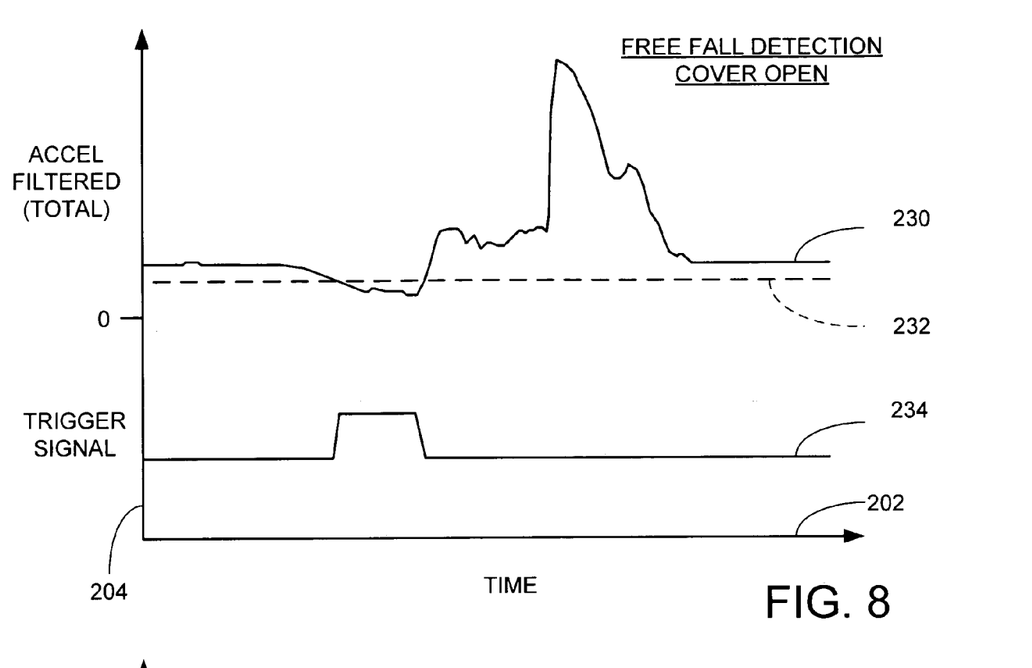
FIG. 8 provides corresponding graphical representations for the active protection system in which the computer laptop is dropped in an open cover orientation.

FIG. 8 shows a corresponding exemplary composite acceleration signal 230 in which the laptop 130 is subjected to a similar free fall event as in FIG. 7, but this time with the cover 138 in an open position such as illustrated in FIG. 3.

As before, the free fall event and subsequent impact are detected and the device is protected thereagainst, as set forth by threshold 232 and trigger signal 234. However, from a comparison of composite signal 230 in FIG. 8 to composite signal 214 in FIG. 7, it can be seen that a significantly different signature is generated, particularly upon impact, depending upon whether the cover 138 is open or closed.

Figure 9:
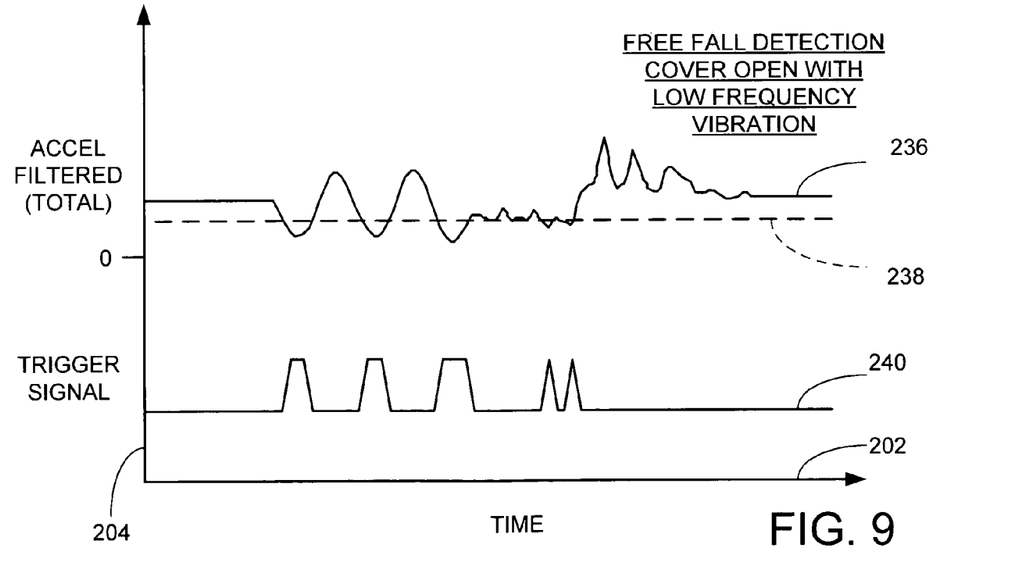
FIG. 9 shows a corresponding graphical representation for the active protection system in which the computer laptop is dropped in an open cover orientation and subjected to a low frequency oscillation.

FIG. 9 adds a background low frequency vibration to the laptop 130 while the cover 138 is open and subjected to a free fall condition. Such vibration may be experienced under certain circumstances due to environmental conditions in which the laptop 130 is being operated (such as, for example, the laptop being dropped or subjected to extreme turbulence during a commercial airliner flight). An exemplary composite acceleration signal is shown at 236. It can be seen from threshold level 238 and trigger signal 240 that several triggering pulses were generated prior to and during the free fall event, and that the additional oscillation at least partially masked the actual time the laptop spent in the free fall condition.

Figure 10:
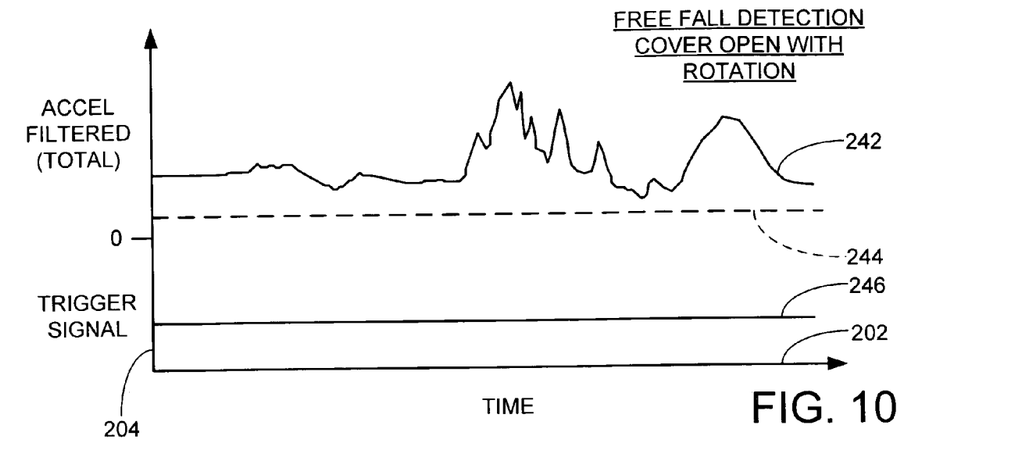
FIG. 10 shows a corresponding graphical representation for the active protection system in which the computer laptop is dropped in an open cover orientation and subjected to rotation.

FIG. 10 shows another exemplary composite acceleration signal 242 for a situation where the cover 138 of the laptop 130 is open and the laptop 130 rotates during free fall, such as in an end-over-end tumbling motion. Such rotation may be imparted, for example, by a frentic user imparting additional moment forces to the device in an unsuccessful attempt to grasp the device as it begins to fall. Alternatively, the device can be operating in an on-going rotational state prior to the free fall event.

The actual characteristics of a composite acceleration signal under such circumstances will tend to vary widely depending upon the nature, character and orientations of such rotation. Nevertheless, the exemplary composite signal 242 is generally illustrative of a case whereby the free fall event may fail to be detected, as indicated by threshold level 244 and trigger signal 246.

Figure 11:
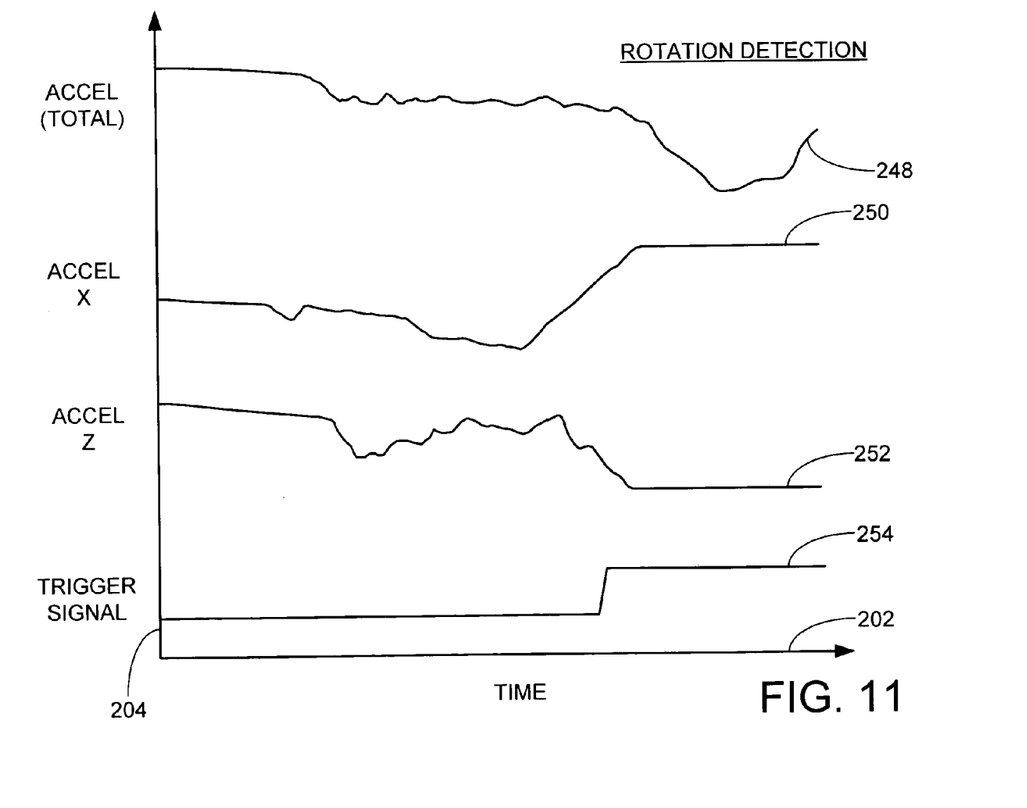
FIG. 11 provides another corresponding graphical representation for the active protection system in which the computer laptop is subjected to a tumbling trajectory.

A free fall condition in the presence of rotation can nevertheless be readily detected using a different signal processing approach, such as set forth by FIG. 11. An exemplary composite acceleration signal is represented at 248, and two orthogonal acceleration signals (in this case, in the respective x and z directions) are shown at 250, 252. A free fall condition in the presence of rotation can generally be detected when the following two conditions are met:

$$T_1 < a_T < T_2 \quad (2)$$

and $$\text{at least two axes are changing phase (e.g. } a_X > T_3 \text{ and } a_Z < T_3) \quad (3)$$

The first condition set forth by equation (2) above corresponds to the composite acceleration value $a_T$ being between two threshold values $T_1$ and $T_2$. Preferably, $T_1$ and $T_2$ are near, and bound, a level of 1 g of acceleration (e.g., $T_1=0.9$ g and $T_2=1.1$ g). So in other words, for the first condition to be met for a given time interval, the composite acceleration value is preferably near 1 g.

The second condition set forth by equation (3) above describes a crossing over of at least two of the acceleration components, in this case $a_x$ and $a_z$, with respect to a threshold $T_3$. Preferably, $T_3$ is at or near 0 g (such as $T_3=0.2$ g). So in other words, for the second condition to be met for a given time interval, one acceleration component is at or near 0 g and moving in the positive direction while another acceleration component is at or near 0 g and is moving in the negative direction.

As shown in FIG. 11, the above processing resulted in a detection of a free fall event at leading edge 256 of trigger signal 254. This processing can be selectively carried out as desired by the active protection system 100, including by the adaptive filter 178 and the threshold block 184 in addition to, or in lieu of, the processing described with respect to FIGS. 7-9.

Figure 12:
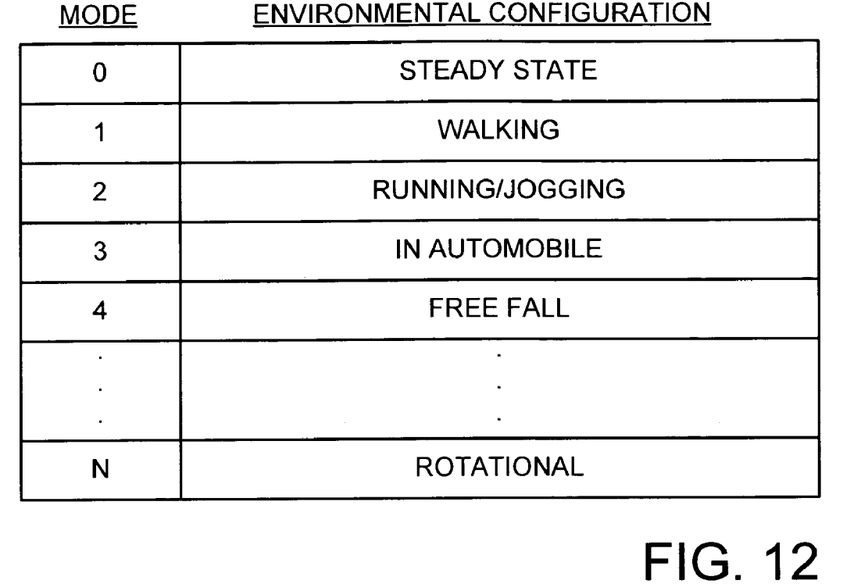
FIG. 12 sets forth an environmental adaptation table to generally illustrate different modes of environmental operation that can be selected by the user or a host of the device.

FIG. 12 sets forth a configuration mode table to provide an exemplary listing of various modes for which the system 100 can be configured to accommodate different environmental and operational conditions. The various modes are preferably selected by a user of the device in accordance with the configuration input module 106 discussed previously in FIG. 1. For reference, the table of FIG. 12 is contemplated as representing different modes for a portable media player that a user can use to access audio, video, or other content during various activities.

In this exemplary embodiment, FIG. 12 shows modes 0 to N to include different environmental conditions such as a steady state mode (mode 0) in which the device is stationary; a walking mode (mode 1) in which the device is carried along by the user while walking (such as on a treadmill); a running/jogging mode (mode 2) denotes operation of the device while the user is running or jogging.

Mode 3 sets forth operation of the device in an automobile or other transit state where various vibratory inputs will be likely present; mode 4 shows a free fall whereby the device is intended to be operated while in a weightless or free fall environment (extreme examples would be listening to music while sky diving or in earth orbit). Exemplary mode N is a rotational mode whereby the unit is operated in a rotational environment. Other modes are readily envisioned.

Preferably, the foregoing modes are user selectable in that the user (or the host device) identifies to the device an expected environmental mode in which the device is to be used. This preferably allows the active protection system 100 to set the various signal processing and threshold values to appropriate levels so as to be able to accurately detect a free fall condition, while compensating for the presence of environmental inputs that may otherwise influence the acceleration state signals generated thereby. Empirical analysis can be used to generate appropriate signal processing, filtering and thresholding steps under these and various other environmental modes.

A host system, such as the laptop 130 discussed above, can further automatically supply configuration inputs to the active protection system 100 in relation to various device states. For example, the laptop 130 can readily be configured to detect that the top cover 138 is opened or closed, and can further provide inputs as to the particular angle that the cover is opened, as each of these can influence the ability of the protection system 100 to operate to detect free fall and other anomalous acceleration modes and protect the device from damage.

Other automated inputs can be provided in a number of different contexts. For example, the deployment of a passenger protection air bag or other active safety system in a motor vehicle can serve as a configuration control input to the active protection system to allow a device to enter a protective mode prior to impact.

The actual communications between the user/host and the device will depend on the requirements of a given application. In the above laptop example, communications such as illustrated in FIG. 2 can take place over existing interfaces between the storage device 140 and the laptop 130, or specially configured interfaces or paths can be implemented as desired.

Similarly, for hand held devices such as mechanical devices, the various inputs and notifications can take place in other ways. For example, a pair of binoculars may have a user selectable mechanical switch that allows a particular sensitivity to a protective device for the binoculars to be set. Thereafter, the protective device is deployed (such as a spring activated cover for the lenses) when the device is dropped, and a visual indication is supplied to the user to notify that the impact has taken place.

Figure 13:
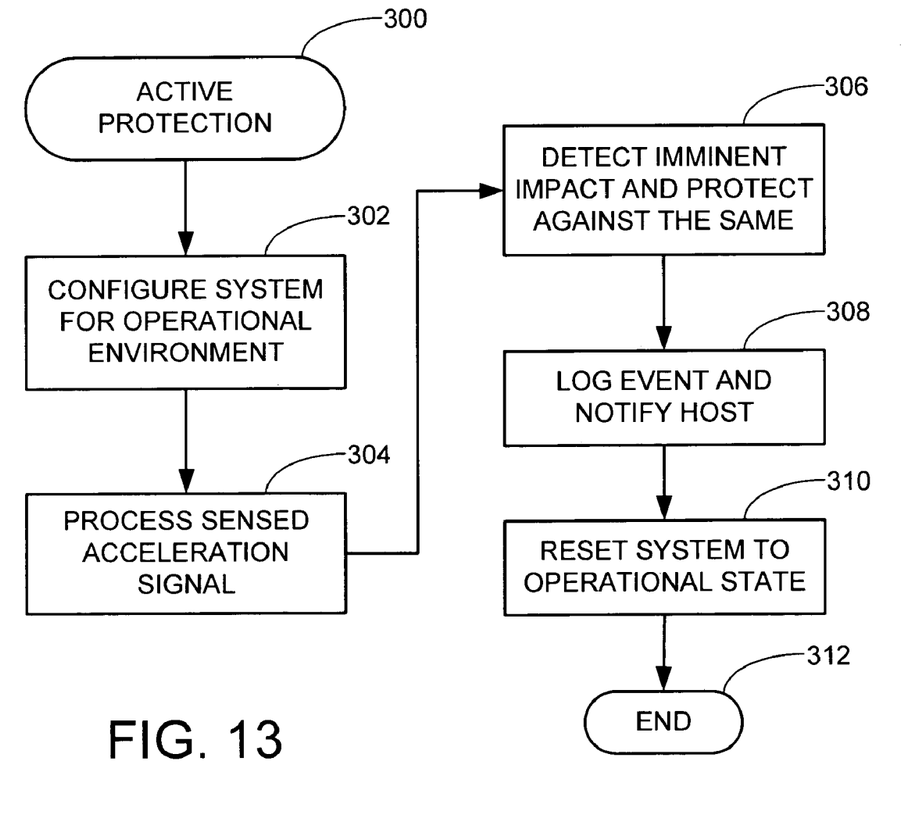
FIG. 13 sets forth an active protection routine, generally illustrative of preferred steps carried out in accordance with preferred embodiments of the present invention.

FIG. 13 shows a flow chart for an active protection routine 300, generally illustrative of steps carried out in accordance with preferred embodiments of the present invention by the active protection system 100 of FIG. 1 to provide free fall detection and protection for a device with which the system 100 is associated.

At step 302, the system is initially configured for the then existing operational environment. This takes place such as through a user selectable input or a host communication, and serves to configure the device for operation in a selected mode as discussed through the operation of block 106.

Acceleration signals are next sensed at step 304, such as by sensor 104, to provide an indication of an acceleration state for the device. An imminent impact event is sensed at step 306 from the acceleration signals and steps are taken to protect the device from damage. These are preferably carried out by the control block 102 and the protection mechanism 108.

At step 308, once the imminent impact has taken place, the event is logged and the host (or user) is notified of the same. These steps are preferably carried out by the host/user notification block 110 and the event recording block 112. The system is thereafter reset at step 310, and the routine is shown to end at step 312.

The manner in which the event is preferably logged will depend on the requirements of a given application. In the laptop example presented above, the storage device 100 preferably maintains a performance log in non-volatile memory to provide a history of the operation of the device. This information is preferably accessible to the user as required.

Off-line routines can also be carried out by the device 140 to evaluate the effectiveness of the protection system; for example, if a number of false triggers take place, the system may operate to automatically change the mode of operation, or may adaptively alter various parameters to enhance sensitivity and effectiveness. Similarly, if multiple free fall events are obtained over time, this information may alter other system reliability calculations so that this information can be considered in making servicing or system replacement recommendations to the user prior to system failure.

The various preferred embodiments discussed above present several advantages over the prior art. The active protection system 100 accommodates a wide variety of operational environments, and enhances protection through the use of user/host mode inputs to further identify an existing operational mode. The system has wide applicability to any number of portable devices, including but not limited to portable electronic devices that employ data storage capabilities.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

What is claimed is:

1. An apparatus comprising:
   a sensor which outputs an acceleration signal in relation to an acceleration state of a device;
   a circuit which processes the acceleration signal in relation to a configuration control input indicative of an operational environment in which the device is operated, wherein said circuit filters the acceleration signal to provide a filtered acceleration signal and wherein said filtering is adaptively modified in relation to the configuration control input; and
   a protection mechanism which configures the device in relation to said processing of the acceleration signal by the circuit.

2. The apparatus of claim 1, further comprising a configuration control module which supplies the configuration control input to the circuit.

3. The apparatus of claim 2, wherein the configuration control module identifies a plurality of environmental modes each individually selectable by a user of the device.

4. The apparatus of claim 2, wherein the configuration control module provides the configuration control input from a host with which the device is associated.

5. The apparatus of claim 1, wherein the circuit generates an imminent impact signal when said processing indicates that the device is in an imminent impact state, and wherein the protection mechanism operates responsive to the imminent impact signal to place the device in a protective state to protect against damage as a result of said imminent impact.

6. The apparatus of claim 1, wherein said processing further comprises comparing the filtered acceleration signal to a selected threshold.

7. The apparatus of claim 1, wherein the device comprises a data storage device, and wherein the protection mechanism comprises a controller which directs a data transducer to move to a load/unload ramp structure.

8. The apparatus of claim 1, wherein the acceleration signal comprises a first acceleration component in a first direction and a second acceleration component in a second direction orthogonal to the first direction, and wherein the processing comprises detecting a free fall condition in relation to a crossover condition of said first and second components and in relation to a magnitude of a composite acceleration value determined from the first and second components.

9. An apparatus comprising:
   a sensor which outputs an acceleration signal in relation to an acceleration state of a device; and
   first means for configuring the device in relation to the acceleration signal and a configuration control input indicative of a selected operational environment in which the device is operated, wherein the first means selectively filters the acceleration signal and selectively applies a threshold to said filtered acceleration signal.

10. The apparatus of claim 9, further comprising a configuration control module comprises a plurality of environmental modes each individually selectable by a user of the device.

11. The apparatus of claim 9, wherein the device comprises a data storage device, and wherein the first means comprises a controller which directs a data transducer to move to a load/unload ramp structure.

12. A method comprising:
    providing an acceleration signal in relation to an acceleration state of a device;
    adaptively filtering the acceleration signal in relation to a configuration control input indicative of an operational environment in which the device is operated; and
    configuring the device in relation to said adaptively filtering step.

13. The method of claim 12, wherein the configuration control input of the adaptively filtering step comprises an environmental mode selected by a user of the device from a plurality of such modes.

14. The method of claim 12, further comprising generating an imminent impact signal when said adaptively filtering indicates that the device is in an imminent impact state, and wherein the configuring step comprises placing the device in a protective state to protect against damage as a result of said imminent impact.

15. The method of claim 12, wherein the acceleration signal of the providing step comprises a first acceleration component in a first direction and a second acceleration component in a second direction orthogonal to the first direction, and wherein the adaptively filtering step comprises detecting a free fall condition in relation to a cross-over condition of said first and second components and in relation to a magnitude of a composite acceleration value determined from the first and second components.

16. The method of claim 12, wherein the device comprises a data storage device, and wherein the configuring step comprises moving a data transducer to move to a load/unload ramp structure.

17. A method comprising:
    providing a plurality of acceleration signal axial components in relation to an acceleration state of a device; and
    detecting a free fall state of the device in relation to respective changes in phase of at least two of said acceleration signal axial components, the detecting step comprising generating a composite acceleration signal from said plurality of acceleration signal axial components, and detecting the free fall state in relation to a magnitude of the composite acceleration signal when the magnitude of the composite acceleration signal is determined to be near 1 g, a first one of the plurality of acceleration signal axial components crosses a threshold T in a first polarity direction, and a second one of the plurality of acceleration signal axial components crosses the threshold T in a second opposite polarity direction.

18. The method of claim 17, further comprising a step of configuring the device in relation to the detecting step.

* * * * *